United States Patent
Mayer et al.

(10) Patent No.: US 6,536,830 B1
(45) Date of Patent: Mar. 25, 2003

(54) CONVERTIBLE TOP FOR A MOTOR VEHICLE AND THE LIKE

(75) Inventors: Hartmut Mayer, Ditzingen (DE); Uwe Henn, Wimsheim (DE)

(73) Assignee: Dr. Ing. h. c. F. Porsche AG, Weissach (DE)

(*) Notice: Subject to any disclaimer, the term of this patent is extended or adjusted under 35 U.S.C. 154(b) by 827 days.

(21) Appl. No.: 08/549,074

(22) Filed: Oct. 27, 1995

(30) Foreign Application Priority Data

Oct. 31, 1994 (DE) .......................................... 44 38 925

(51) Int. Cl.[7] ................................................. B60J 7/12
(52) U.S. Cl. .................................. 296/107.01; 296/117
(58) Field of Search ............................... 296/107, 112, 296/117, 115; 92/53, 117 A

(56) References Cited

U.S. PATENT DOCUMENTS 2,323,547 A * 7/1943 Levon .......................... 296/117
2,550,925 A    5/1951 Weimar
5,014,602 A * 5/1991 Iwata ......................... 92/117 A

FOREIGN PATENT DOCUMENTS

DE          889 270       9/1953

* cited by examiner

Primary Examiner—Dennis H. Pedder
(74) Attorney, Agent, or Firm—Crowell & Moring LLP

(57) ABSTRACT

A convertible top for a vehicle, especially a motor vehicle, has a convertible top frame assembly pivotably mounted on convertible top bearings located on the body. A working cylinder composed of a cylinder and a piston rod is mounted on the top frame assembly adjacent to at least one top bearing to open and close the convertible top. Both ends of the piston rod of the working cylinder are permanently mounted on the top bearing and the cylinder and movably mounted on the piston rod, is operationally linked with a drive lever that opens and closes the folding top, oil is supplied under pressure to the working cylinder through bores in the stationary piston rod.

12 Claims, 4 Drawing Sheets

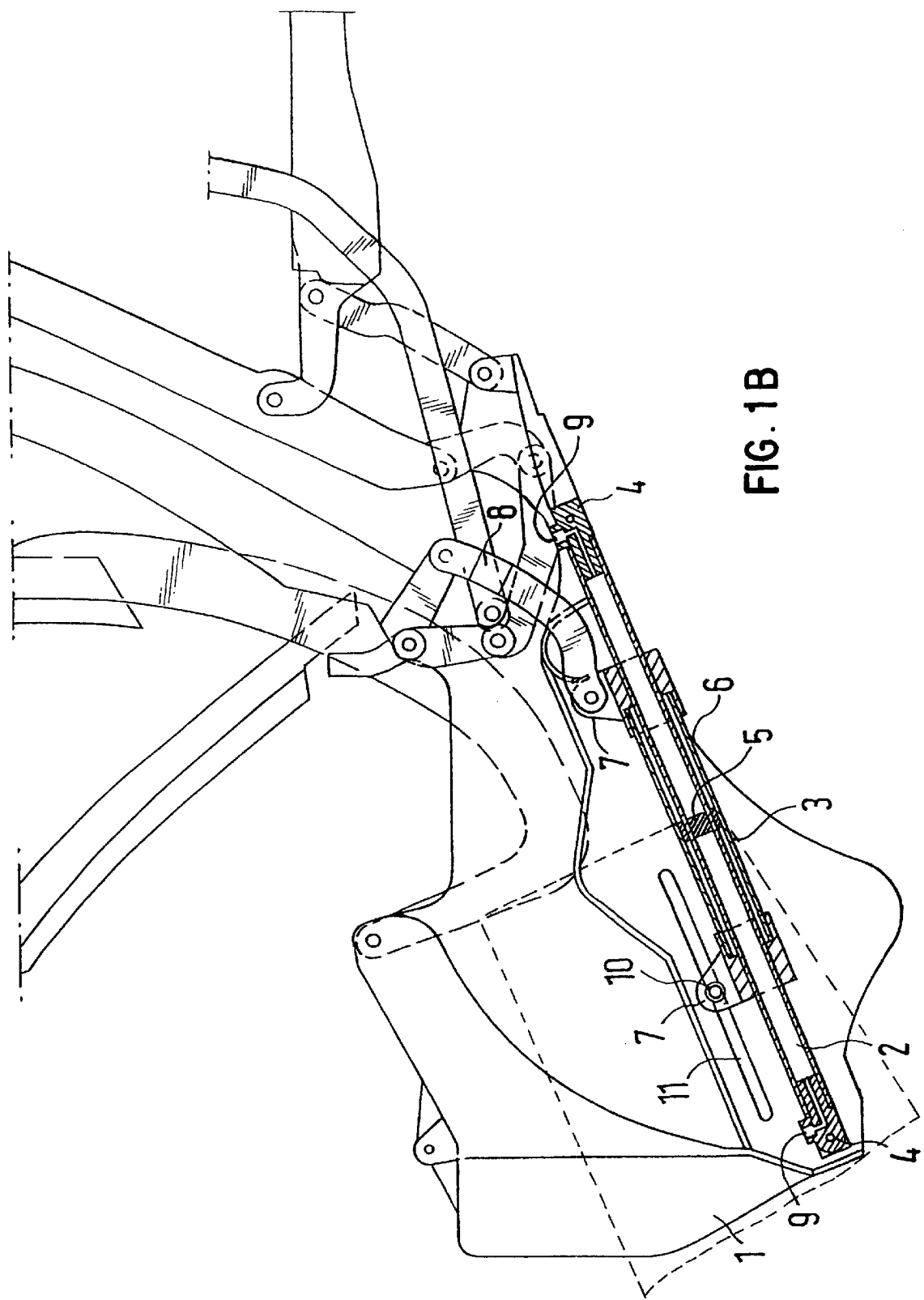

CONVERTIBLE TOP FOR A MOTOR VEHICLE AND THE LIKE

BACKGROUND AND SCARY OF THE INVENTION

The present invention relates to a convertible top for a vehicle, especially a motor vehicle, with a convertible top frame assembly pivotably mounted on convertible top bearings located on the body. A working cylinder is composed of a cylinder and a piston rod to support the opening and closing movement of the convertible top on convertible top frame assemblies adjacent to at leapt one convertible top bearing.

A folding convertible top is described in German Patent 889 270. This known folding convertible top has convertible top frame assemblies and a top covering. The frame assemblies are fastened by two convertible top bearings located laterally on the vehicle body. To open and close the top, two hydraulic working cylinders are fastened at one end to the vehicle body. The piston rods of the working cylinders are each articulated with a drive lever which acts on the frame assemblies so that the folding convertible top can be opened and closed.

A disadvantage of this known arrangement is that the working cylinders take up considerable room because they are fastened to the body. In addition, flexible oil pressure lines run to the working cylinders and follow their movements, and can be damaged by rubbing against parts of the vehicle, or the flexible oil lines can be cut through. In addition, the working cylinders must be mounted separately when the folding convertible top is mounted on the vehicle body, which separate mounting is time-consuming when assembling the vehicle.

An object of the present invention is to provide a convertible top for a vehicle to overcome the above-mentioned disadvantages.

This object has been achieved according to the present invention by providing that ends of the piston rod mounted permanently on the top bearing, and the cylinder, is movably mounted on piston rod, and is operatively linked with a drive lever configured to open and close the convertible top, and bores in stationary piston rod for supplying oil under pressure to the working cylinder.

Primary advantages achieved with the present invention include a minimum space requirement. This configuration allows oil to be supplied under pressure to the working cylinders using rigid lines, so that flexible lines are eliminated and the complete folding convertible top can be mounted as a preassembled unit, including the working cylinders, on the vehicle body.

By mounting the piston rods in one location on the top bearings and using a cylinder that is movable on the piston rod and communicates with a drive lever of the folding top, the space requirements for the working cylinders are minimized because there is no longer any need for supporting the working cylinders on the vehicle body. When oil is supplied under pressure to the working cylinder through the stationary piston rods, rigid lines can be used, so that the flexible lines, which are larger in volume and are prone to being cut, are eliminated.

In addition, the complete convertible top including the working cylinder can be preassembled and mounted as a finished unit on the vehicle. Only the connection of the rigid pressure lines for the oil must be connected to the ends of the piston rods.

BRIEF DESCRIPTION OF THE DRAWINGS

These and other objects, features and advantages of the present invention will become more readily apparent from the following detailed description thereof when taken in conjunction with the accompanying drawings wherein:

FIG. 1B is a partial cross-sectional side view of the convertible top actuating device of FIG. 1A but with the top open halfway;

DETAILED DESCRIPTION OF THE DRAWINGS

Figure 1A:
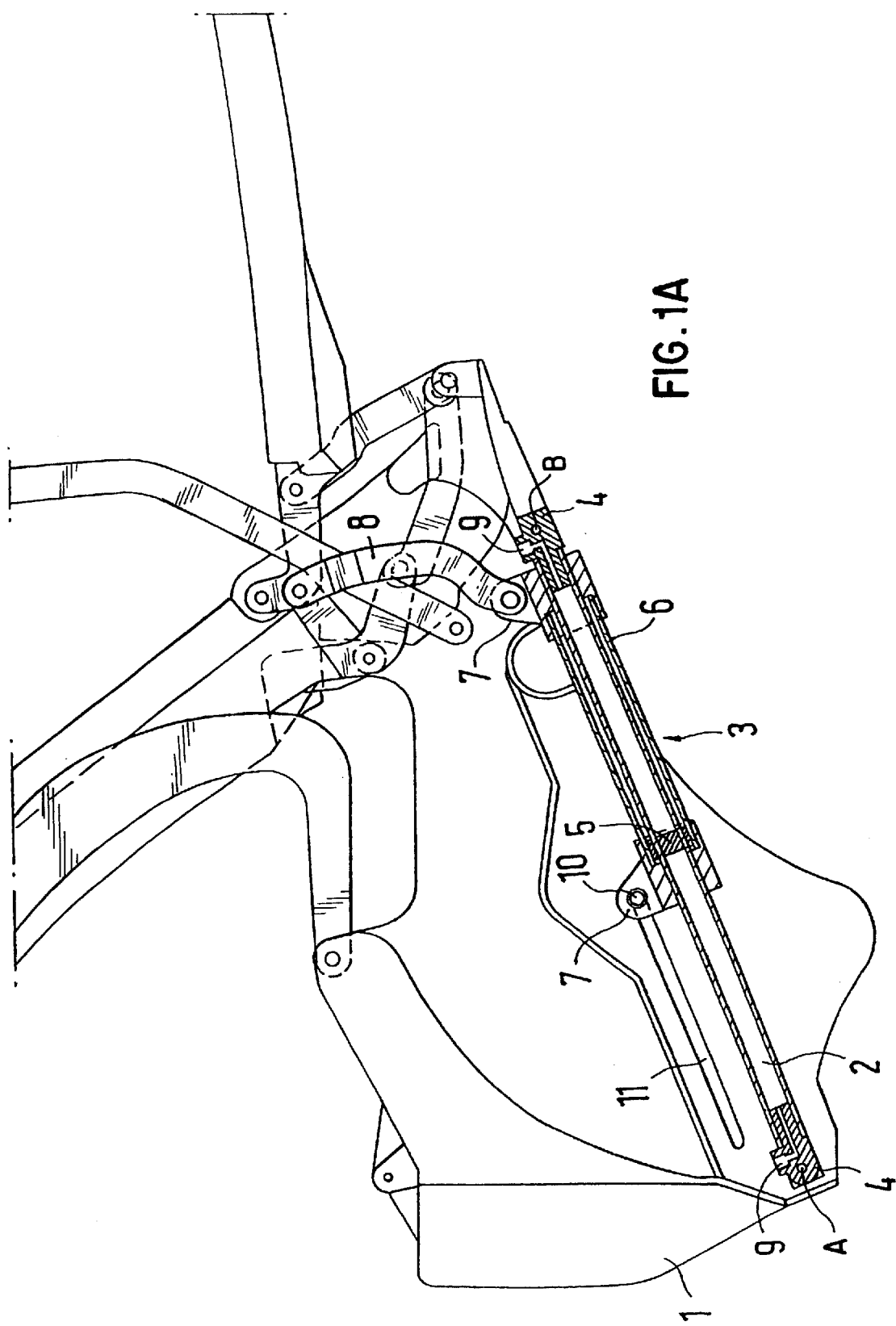
FIG 1a is a partial cross-sectional side view of the convertible top actuating device with the top closed in which the dashed arrow shows how the piston rod is configured to be supplied with oil under pressure from the right or left side depending on whether the top is to be opened or closed.

In FIG. 1A, a side view of a convertible top bearing 1 is shown with the elements of the convertible top frame assembly fastened thereto, and with the folding top in the designated generally by numeral 3 is fastened at points A, B at both 4 to the convertible top bearing 1. A piston 5 is mounted centrally on the piston rod 2. A cylinder 6 slides on the fixed piston rod 2 and is connected at end 7 thereof with a drive lever a that acts on the convertible top frame assembly.

The working cylinder 3 for opening and closing the convertible top is a double-acting cylinder 6. That is, it acts on the top frame assemblies during both the opening and closing movements. Pressurized oil may be conducted to both ends 4 of the piston rod 2. The pressurized oil is conducted through holes 9 into the hollow interior of the piston rod 2 and into the respective chamber of the working cylinder 3.

If space requirements necessitate an off-center connection of the drive lever 8 at the cylinder end 7, a twisting of the cylinder 6 can be prevented by a bolt 10 fastened at the other end 7 of cylinder 6 and sliding in a guide 11 on top bearing 1. Of course, other ways of preventing twisting are possible.

The folding convertible top, including t he working cylinders 3 attached to the top bearing 1, is preassembled as a finished unit and then mounted on the vehicle body. The fixed attachment of the piston rod 2 to the convertible top bearing 1 produces a compact space-saving configuration. Oil is supplied under pressure through rigid lines connected to the ends 4 of the piston rod 2.

FIG. 1B shows the convertible top bearing 1 with the elements of the top frame assembly attached thereto and the top in a half-open position. Oil is supplied under pressure through the left end 4 of the piston rod 2 to move the top from the closed position rightward into the half-open position.

Figure 1C:
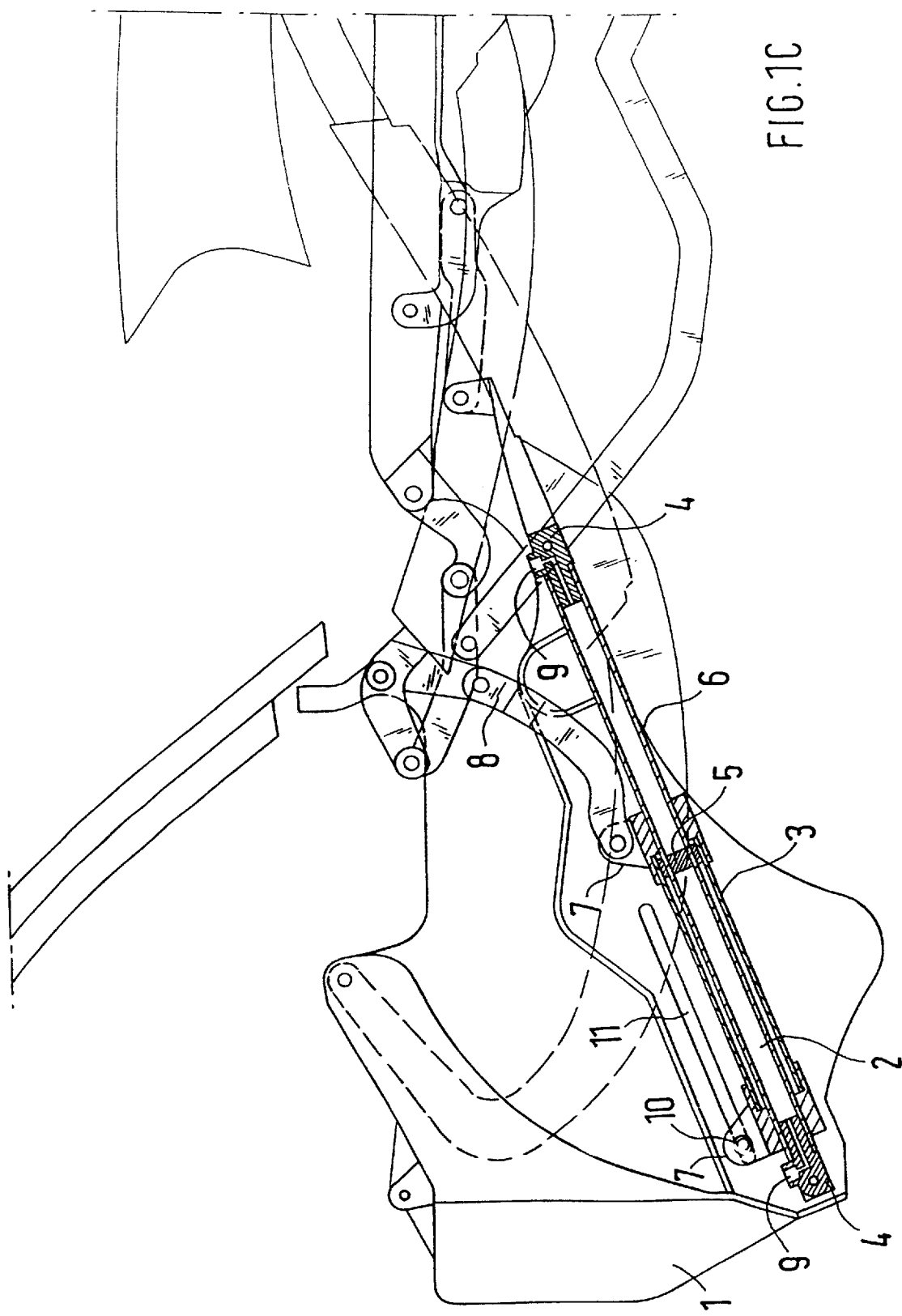
FIG. 1C is a side view of the convertible top actuating device of FIG. 1A but with the top open.
Figure 1D:
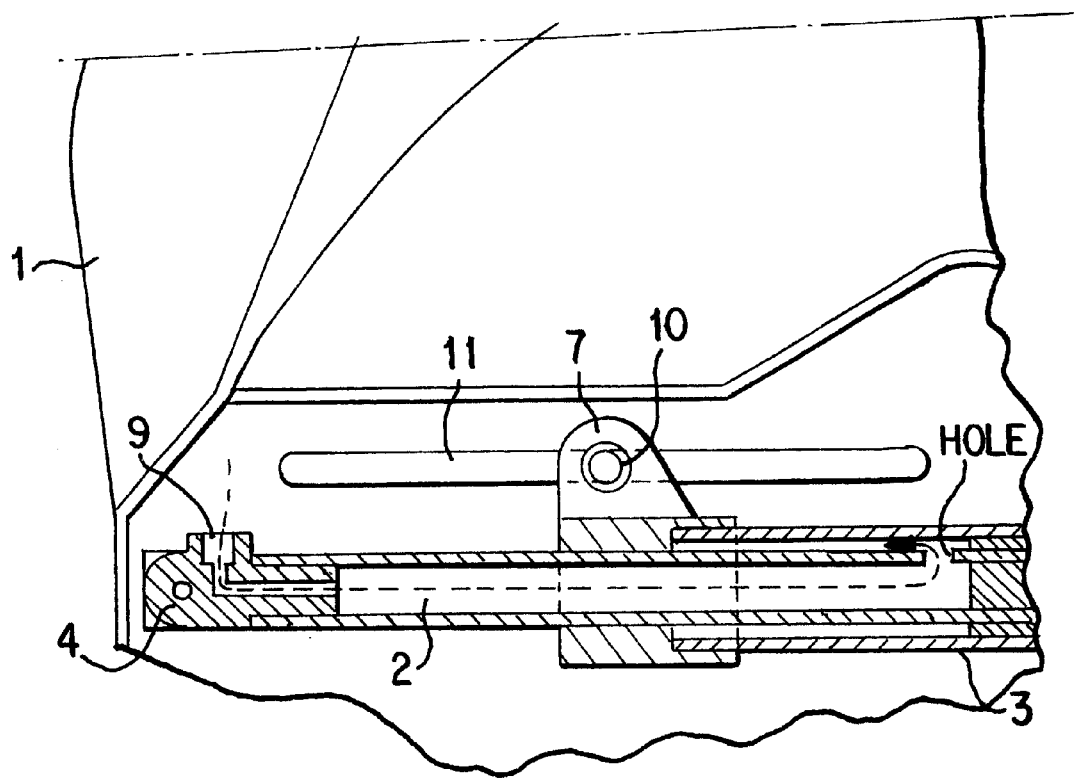
FIG. 1D is an enlarged, isolated, partial cross-sectional side view of the device shown in the area designated by dash lines in FIG. 1B showing how the piston rod is configured to supply oil under pressure to the working cylinder through a hole in the wall of the piston rod and the path of the oil through the piston rod into the left chamber of the working cylinder being shown in dash lines.

FIG. 1C shows the top in the fully-open position. The top is fully opened by continuing to supply oil under pressure through the left end 4 of the piston rod 2. The supply of oil under pressure causes the cylinder 6 to be displaced leftwardly; the top is closed in a reverse process, i.e. by supplying oil under pressure through the right end 4 of the piston rod 2, and displacing the cylinder 6 rightwardly to the half-open position shown in FIG. 1B and finally into the fully closed position of FIG. 1A.

It has proven advantageous to provide a working cylinder 3 at each of top bearings 1 in order to ensure uniform torsion-free operation of the convertible top.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A convertible top for a vehicle, comprising a vehicle body, a top bearing operatively mounted on the vehicle body, convertible top frame assemblies pivotably mounted on the top bearing, at least one working cylinder including a cylinder and a stationary piston rod engaging the top bearing to open and close the convertible top, wherein ends of the piston rod are mounted permanently on the top bearing, and the cylinder is movably mounted on piston rod and is operatively linked with a drive lever configured to open and close the convertible top, and the piston rod configured to be supplied with oil under pressure to the working cylinder.

2. The convertible top according to claim 1, wherein the cylinder is a double-acting cylinder.

3. The convertible top according to claim 1, wherein a piston is mounted centrally on the piston rod, and the oil is supplied under pressure alternately from the ends of the piston rod through the bores.

4. The convertible top according to claim 1, wherein the drive lever is connected at one end of the cylinder.

5. The convertible top according to claim 1, wherein the drive lever is connected eccentrically at one end of the cylinder, and another end of cylinder is fastened to the vehicle be protected against torsion.

6. The convertible top according to claim 5, wherein the another end is protected against torsion via a bolt mounted at the other end and arranged to slide in a guide of the top bearing.

7. The convertible top according to claim 1, wherein a working cylinder is mounted on each top bearing.

8. The convertible top according to claim 7, wherein the cylinder is a double-acting cylinder.

9. The convertible top according to claim 7, wherein a piston is mounted centrally on the piston rod, and the oil is supplied under pressure alternately from the ends of the piston rod through the bores.

10. The convertible top according to claim 7, wherein the drive lever is connected centrally at one end of the cylinder.

11. The convertible top according to claim 7, wherein the drive lever is connected eccentrically at one end of the cylinder, and another end of cylinder is fastened to the vehicle be protected against torsion.

12. The convertible top according to claim 11, wherein the another end is protected against torsion via a bolt mounted at the other end and arranged to slide in a guide of the top bearing.

* * * * *